(12) United States Patent
Yonekura et al.

(10) Patent No.: US 6,326,702 B1
(45) Date of Patent: Dec. 4, 2001

(54) OUTPUT CONTROL SYSTEM FOR SERIES HYBRID VEHICLE

(75) Inventors: Takahiro Yonekura; Yusuke Hasegawa; Takashi Kakinuma; Hiroyuki Abe, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/465,399

(22) Filed: Dec. 17, 1999

(30) Foreign Application Priority Data

Dec. 18, 1998 (JP) .................................................. 10-361497

(51) Int. Cl.[7] ................. F02N 11/06; H02P 9/04
(52) U.S. Cl. .................. 290/40 C; 290/40 R; 290/40 A; 290/40 B; 290/40 D; 290/40 E; 290/40 F
(58) Field of Search ................. 290/40 A–40 F, 290/13; 322/18; 180/65.2, 65.4, 65.8; 60/706, 710

(56) References Cited

U.S. PATENT DOCUMENTS

| | | | |
|---|---|---|---|
| 5,621,304 | * | 4/1997 | Kiuchi et al. ............... 322/18 |
| 5,939,794 | * | 8/1999 | Sakai et al. ................ 290/40 A |
| 6,123,163 | * | 9/2000 | Otsu et al. ................. 180/65.8 |
| 6,173,574 | * | 1/2001 | Obayshi et al. ............. 60/710 |

FOREIGN PATENT DOCUMENTS

| | | |
|---|---|---|
| 5-146008 | 6/1993 | (JP) . |
| 8-74545 | 3/1996 | (JP) . |

* cited by examiner

Primary Examiner—Elvin Enad
(74) Attorney, Agent, or Firm—Arent Fox Kintner Plotkin & Kahn, PLLC

(57) ABSTRACT

A system for controlling a series hybrid vehicle, having an internal combustion engine whose output is regulated by a throttle valve, a generator-motor connected to the engine to be rotated by the engine, an electric energy storage means connected to the first generator-motor to be charged by the first generator-motor, and a second generator-motor connected to at least one of the first generator-motor and the electric energy storage means to input an output of at least one of the first generator-motor and the electric energy storage means to drive wheels of the vehicle to propel the vehicle. In the system, a desired engine speed is determined to minimize fuel consumption, and a desired power generation amount of the first generator-motor is determined based on a determined desired power generation base value and the desired engine speed. Then, the throttle opening is controlled to achieve the desired power generation amount, thereby optimizing fuel consumption, while rapidly converging the engine speed on the desired value, without stalling the internal combustion engine.

20 Claims, 7 Drawing Sheets

DESIRED THROTTLE OPENING THLCMD =
DESIRED THROTTLE OPENING BASE VALUE THLMAP + PID (PGCMD – PGA)

DESIRED POWER GENERATION AMOUNT PGCMD =
DESIRED POWER GENERATION BASE VALUE PGCMDBS + KNE(NE–NECMD)

OUTPUT CONTROL SYSTEM FOR SERIES HYBRID VEHICLE

BACKGROUND OF THE INVENTION

1. Field of the Invention

This invention relates to an output control system for a series hybrid vehicle, more particularly to an output control system for a series hybrid vehicle that controls the output (power) of a generator-motor so as to achieve the input required by an electric motor for driving wheels at the engine speed providing optimum fuel efficiency in real time.

2. Description of the Related Art

Hybrid vehicles that combine a generator-motor and an internal combustion engine are of two general types: series hybrid vehicles whose wheels are driven solely by an electric motor (generator-motor) and parallel hybrid vehicles whose wheels are driven by either or both an electric motor (generator-motor) or and an internal combustion engine.

A series hybrid vehicle is generally equipped with an internal combustion engine, a first generator-motor connected with the engine, a battery (electrical energy storage means) connected with and charged by the first generator-motor, and an electric motor (second generator-motor) for driving the wheels that is powered by the output of either the first generator-motor or the battery. Various techniques have been proposed for controlling the output of the first generator-motor of such a series hybrid vehicle.

Japanese Laid-Open Patent Application No. Hei 5(1993)-146,008, for example, teaches a system for achieving power distribution without causing mechanical shock that responds to the input required by the wheel drive motor by selecting one mode from among "battery only," "generator-motor only" and "battery plus generator-motor," determines the generator-motor output voltage needed to effect the required input in the selected mode, and, while monitoring the generator-motor output voltage, battery output voltage, engine speed or generator-motor output voltage, controls the field current of the generator-motor to obtain the determined generator-motor output.

More specifically, this conventional system attempts to improve fuel efficiency by operating the internal combustion engine in the range between 100% and 60% of maximum output and effecting operation outside this operating range in combination with the battery or by the battery alone.

However, the way these conventional technologies deal with the wheel drive motor being operated at maximum output is to add the battery output to the generator-motor output. Therefore, at a time when the wheel drive motor is operating at maximum output, if an attempt should be made to secure all power required by the wheel drive motor solely from the generator-motor without relying on the battery, the internal combustion engine would have to be operated over a relatively broad output range.

From the viewpoint of fuel efficiency, an internal combustion engine should preferably be operated at the BSFC (Brake Specific mean Fuel Consumption) point, i.e., the point where fuel consumption is minimum. The conventional technologies leave room for fuel efficiency improvement, particularly when operation over a relatively broad range is attempted as discussed above.

Moreover, when the on-board battery of the vehicle is relatively small, and also when the required input increases momentarily in response to the operating state, supply of the required input must be controlled in real time.

SUMMARY OF THE INVENTION

A first object of the present invention is therefore to overcome the drawbacks explained in the foregoing by providing an output control system for a series hybrid vehicle that determines the desired output (power) of the first generator-motor based on the requirement of the second generator-motor (electric motor) in real time and supplies the desired output (power) in real time while effecting operation so as to minimize internal combustion engine fuel consumption, i.e., optimize the BSFC.

When the desired engine speed is determined to optimize the BSFC, from the aspect of response rapid convergence on the desired value is preferable.

A second object of the present invention is therefore to provide an output control system for a series hybrid vehicle that determines the desired output (power) of the first generator-motor based on the requirement of the second generator-motor (electric motor) in real time, supplies the desired output (power) in real time while effecting operation so as to minimize internal combustion engine fuel consumption, i.e., optimize the BSFC, and improves response by rapidly converging the engine speed on the desired value.

When the engine speed is rapidly converged on the desired value, the internal combustion engine must be prevented from stalling.

A third object of the present invention is therefore to provide an output control system for a series hybrid vehicle that determines the desired output (power) of the first generator-motor based on the requirement of the second generator-motor (electric motor) in real time, supplies the desired output (power) in real time while effecting operation so as to minimize internal combustion engine fuel consumption, i.e., optimize the BSFC, and improves response by rapidly converging the engine speed on the desired value without stalling the internal combustion engine.

This invention achieves these objects by providing a system for controlling an output of a series hybrid vehicle, having an internal combustion engine whose output is regulated by a throttle valve, a generator-motor connected to the engine to be rotated by the engine, an electric energy storage means connected to the first generator-motor to be charged by the first generator-motor, and a second generator-motor connected to at least one of the first generator-motor and the electric energy storage means to input an output of at least one of the first generator-motor and the electric energy storage means to drive wheels of the vehicle to propel the vehicle, comprising; desired first generator-motor power generation base value determining means for determining a desired power generation base value of the first generator-motor which the first generator-motor is desired to generate desired engine speed determining means for determining a desired engine speed which the engine is desired to generate; desired first generator-motor power generation amount determining means for determining a desired power generation amount of the first generator-motor which the first generator-motor is desired to generate, based on the determined desired power generation base value and the desired engine speed; desired throttle opening determining means for determining a desired throttle opening of the throttle valve based on the desired power generation amount of the first generator-motor, and throttle valve driving means for driving the throttle valve based on the determined throttle opening.

BRIEF EXPLANATION OF THE DRAWINGS

This and other objects and advantages of the invention will be more apparent from the following description and drawings, in which.

DETAILED DESCRIPTION OF THE PREFERRED EMBODIMENT

An embodiment of the present invention will now be explained with reference to the drawings.

Figure 1:
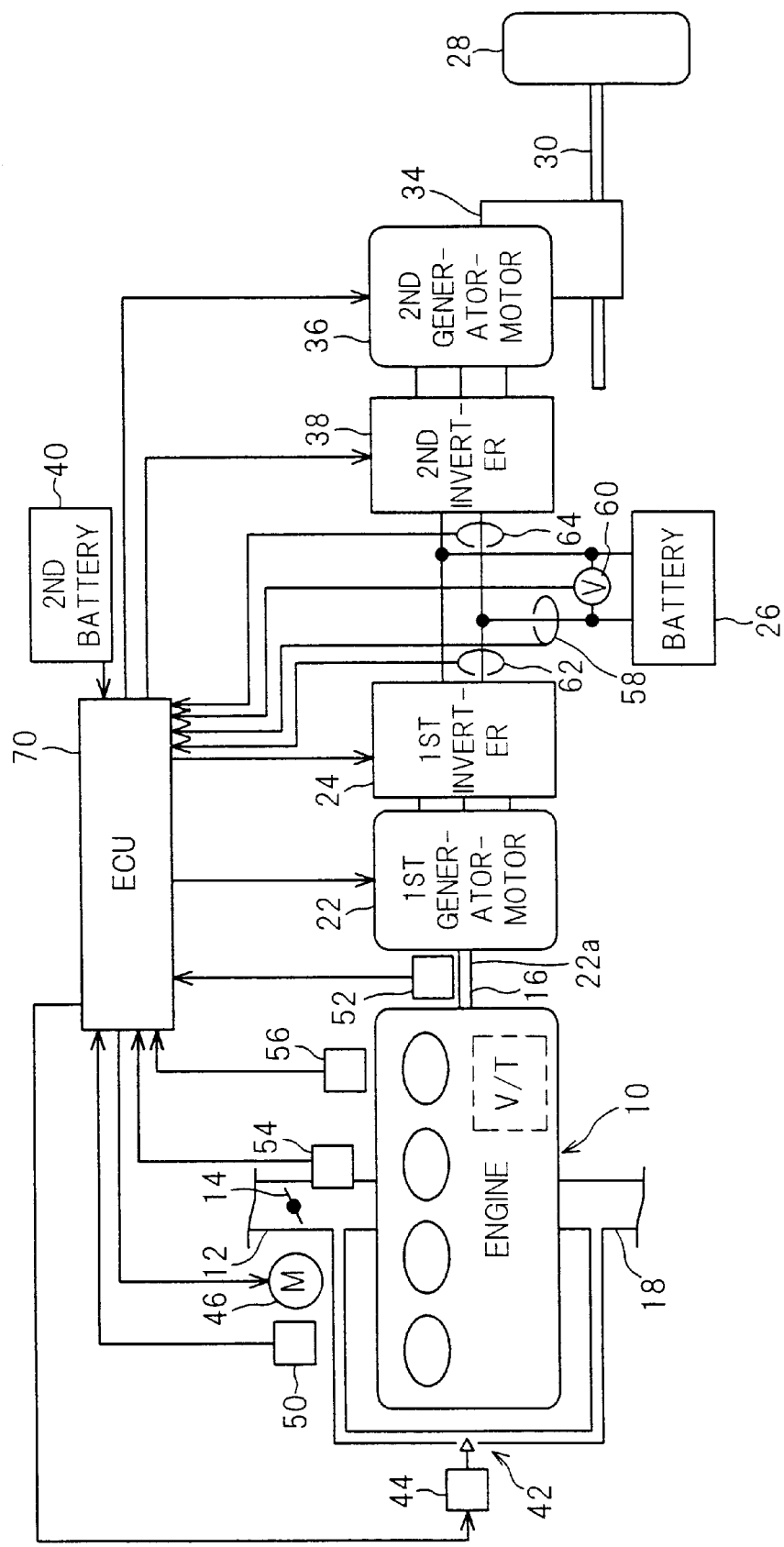
FIG. 1 is an overall schematic view showing an output control system for a series hybrid vehicle according to an embodiment of the invention.

FIG. 1 is an overall schematic view of an output control system for a series hybrid vehicle for explaining embodiments of the present invention.

Reference numeral 10 in this figure designates an OHC in-line four-cylinder internal combustion engine (hereinafter called simply "engine"). Air drawn into an air intake pipe 12 through an air cleaner (not shown) mounted on its far end is supplied to the cylinders (not shown) through a surge tank (not shown) and an intake manifold (not shown), while the flow thereof is adjusted by a throttle valve 14.

A fuel injector (not shown) for injecting fuel is installed in the vicinity of the intake valve (not shown) of each cylinder. The injected fuel mixes with the intake air to form an air-fuel mixture that is ignited in the associated cylinder by a spark plug (not shown). The resulting combustion of the air-fuel mixture drives down a piston (not shown) to rotate a crankshaft 16.

The exhaust gas produced by the combustion is discharged through an exhaust valve (not shown) into an exhaust manifold (not shown), from where it passes through an exhaust pipe 18 to a catalytic converter (not shown) to be purified and then discharged to the exterior.

The engine 10 is connected to a first generator-motor 22. Specifically, the crankshaft of the engine 10 is coaxially connected directly to an input shaft 22a of the first generator-motor 22. The first generator-motor 22 is therefore rotated synchronously with the rotation of the engine 10.

The first generator-motor 22 is a DC brushless generator-motor and can produce approximately the same output as the engine 10. The first generator-motor 22 operates as an electric motor or a generator in response to a desired command value.

The first generator-motor 22 is connected through a first inverter 24 to a battery 26 (electrical energy storage means) installed at an appropriate place in the vehicle (not shown) equipped with the engine 10. When the first generator-motor 22 operates as a generator its output or power (generated energy) is converted to DC voltage by the first inverter 24 and the DC voltage is used to charge the battery 26.

When the first generator-motor 22 operates as an electric motor, battery discharge voltage is converted to AC by the first inverter 24 and applied to the first generator-motor 22 to rotate the engine 10. Driven wheels 28 of the vehicle (front wheels; only one shown) are connected through drive shafts 30 (only one shown) to a differential mechanism 34 whose input end is connected directly to the output shaft of a second generator-motor 36.

The second generator-motor 36 is also a DC brushless generator-motor and like the first generator-motor 22 can also produce approximately the same output as the, engine 10. The second generator-motor 36 also operates as an electric motor or generator in response to a desired command value.

The second generator-motor 36 is connected through a second inverter 38 to the battery 26. When the second generator-motor 36 operates as a generator its output or power (generated energy) is converted to DC voltage by the second inverter 38 and the DC voltage is used to charge the battery 26. When the second generator-motor 36 operates as an electric motor, battery discharge voltage is converted to AC by the second inverter 38 and applied to the second generator-motor 36 to rotate the drive wheels 28 and propel the vehicle.

The vehicle is thus constituted as a series hybrid vehicle that rotates the wheels solely by the output of the second generator-motor 36. In the series hybrid vehicle of this embodiment, the input required by the second generator-motor 36 (the required electric power) is determined (calculated) in real time based on the operating condition of the vehicle and the determined (calculated) required input is basically supplied solely by the first generator-motor 22 having substantially the same output capability as the engine 10.

While this is the basic operation, exceptions arise because the engine 10 is operated intermittently. Specifically, in the high-load region it is operated at the high-efficiency point where the BSFC is optimum, i.e., at the point of minimum fuel consumption, and is stopped in the low-load region. When the engine 10 is stopped and the first generator-motor 22 therefore produces no output, the input required by the second generator-motor 36 is supplied by the battery 26.

The battery 26 need only be capable of output of power during intermittent operation and input/output of power during regeneration. It can therefore be a battery of relatively small capacity capable of providing voltage on the level commonly used in electric vehicles (200 V–300 V). A second on-board battery 40 of around 12 V is provided separately of the battery 26 at an appropriate place on the engine 10 for supplying power to an Electronic Control Unit (ECU) 70 and other electrical components.

The engine 10 is equipped with an EGR system 42 that uses a bypass to return part of the exhaust gas from the exhaust pipe 18 to the air intake pipe 12. The EGR rate is adjusted by an EGR control valve 44. The engine 10 is also equipped with a variable valve timing system (denoted as V/T in FIG. 1) that varies the opening/closing times and the lifts (including rest operation) of the intake and exhaust valves. As the variable valve timing system V/T is described in Japanese Laid-Open Patent Application No. Hei 8(1996)-74,545, for example, it will not be described further here.

The throttle valve 14 is connected with and opened/closed by a stepping motor 46 not mechanically linked with an accelerator pedal (not shown) located on the floor of the vehicle near the vehicle operator's seat. A throttle position sensor 50 is connected with the stepping motor 46 and, based on the amount of rotation of the stepping motor, outputs a signal representing the opening of the throttle valve 14 (throttle opening TH).

A crank angle sensor 52 installed in the vicinity of the crankshaft 16 of the engine 10 outputs a signal representing the piston crank angles and a manifold absolute pressure sensor 54 provided in the air intake pipe 12 downstream of the throttle valve 14 outputs a signal representing the absolute manifold pressure (indicative of engine load) PBA. A coolant temperature sensor 56 provided at an appropriate place in a coolant water passage (not shown) of the engine 10 outputs a signal representing the engine coolant temperature TW.

A current sensor 58 and a voltage sensor 60 incorporated in an input/output circuit of the battery 26 output signals proportional to the input/output current and voltage of the battery 26. Current sensors 62 and 64 incorporated in input/output circuits of the first generator-motor 22 and the second generator-motor 36 output signals proportional to the respective input/output currents.

The outputs of the sensors are sent to the ECU 70. The ECU 70, which comprises a microcomputer, controls the operation of, among others, the engine 10, the first generator-motor 22 and the second generator-motor 36 based on the sensor outputs.

The operation of the output control system for the series hybrid vehicle according to this embodiment will now be explained.

Figure 2:
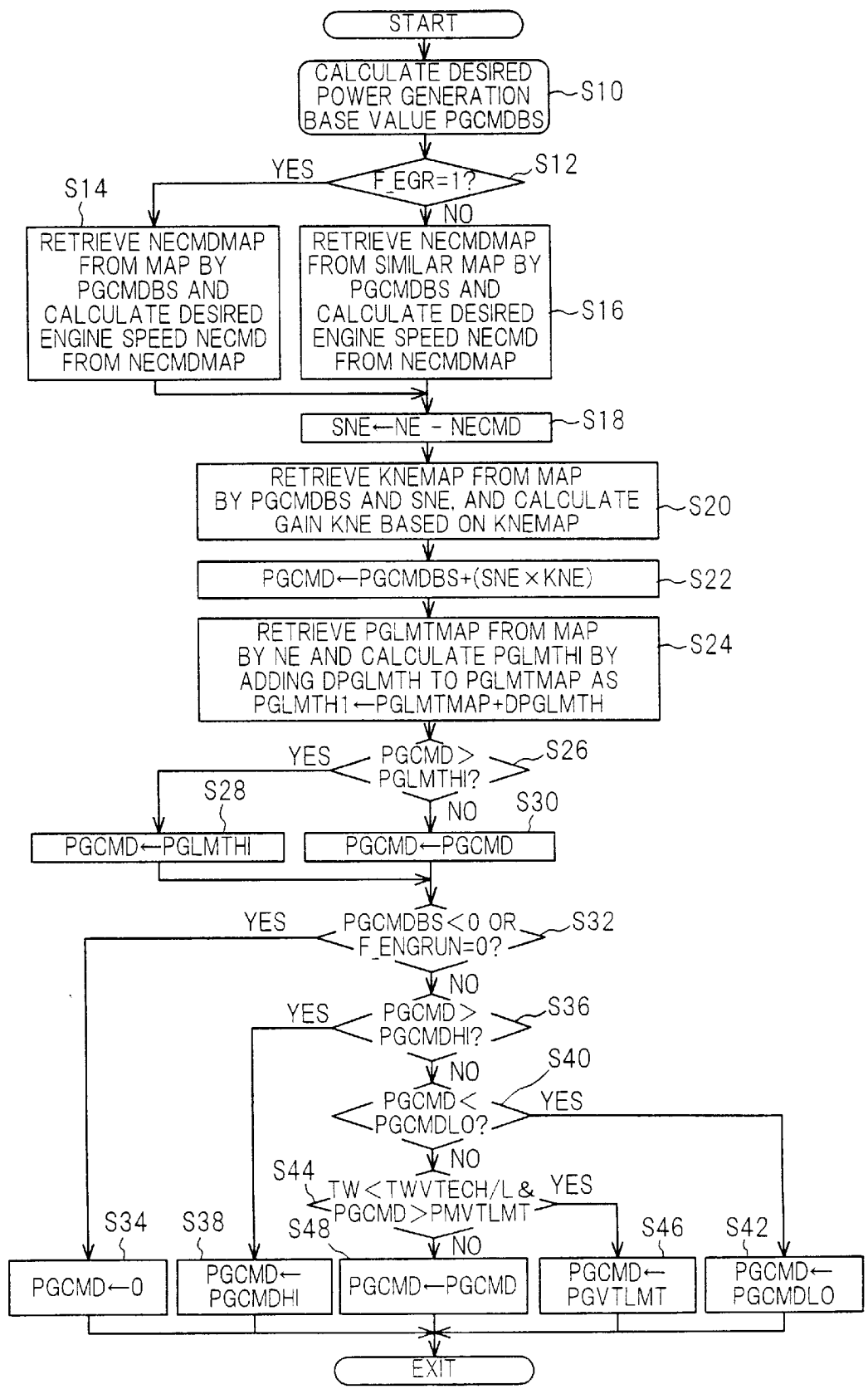
FIG. 2 is a flow chart showing the operation of the system, more particularly the calculation or determination of a desired amount of electric power generation PGCMD during the operation of the control system illustrated in FIG. 1.

FIG. 2 is a flow chart of the processing operations for calculating (determining) the desired amount of electric power generation during operation of the outputs control system. The program according to this flow chart is executed at prescribed intervals; of, for example, 10 msec.

First, in S10, a desired power generation base value PGCMDBS is calculated (determined).

This will be explained. As mentioned earlier, in the system of this embodiment, the first generator-motor 22 supplies (generates) the required input of the second generator-motor 36 (the amount of power generated/consumed) in real time, without going through the battery 26, which therefore does not require large capacity. Specifically, a desired output (desired torque and required input or power consumption) is determined based on the amount of operation of the accelerator pedal by the vehicle operator and the current vehicle speed. Next, the desired output is multiplied by a correction coefficient to correct it for the efficiency of the battery 26 and the efficiencies of the first and second inverters 24 and 38. The product is defined as the desired power generation base value PGCMDBS of the first generator-motor 22.

Next, in S12, it is checked whether the bit of a flag F.EGR is set to 1. The bit of this flag is set to 1 in the ECU 70 when EGR control is being effected. The check in S12 therefore amounts to determining whether or not EGR control is being conducted in the engine 10.

Figure 3:
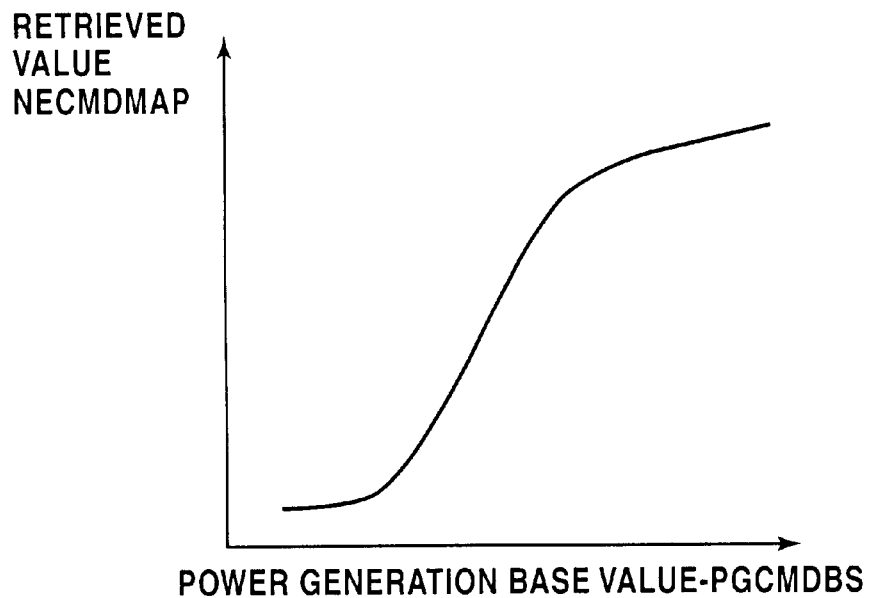
FIG. 3 is an explanatory graph showing the characteristics of a map defining a desired power generation base value PGCMDBS referred to in the flow chart of FIG. 2.

When the result in S12 is YES, the program goes to S14, in which a value NECMDMAP is retrieved from a map NECMDMPE (whose characteristics are shown in FIG. 3) using the desired power generation base value PGCMDBS as address datum and the desired engine speed NECMD is calculated or determined from the retrieved value NECMDMAP. When the result is NO, the program goes to S16, in which the desired engine speed NECMD is calculated from the value retrieved from a similar map NECMDMP (whose characteristics are not shown) using the same parameter as address datum.

Figure 4:
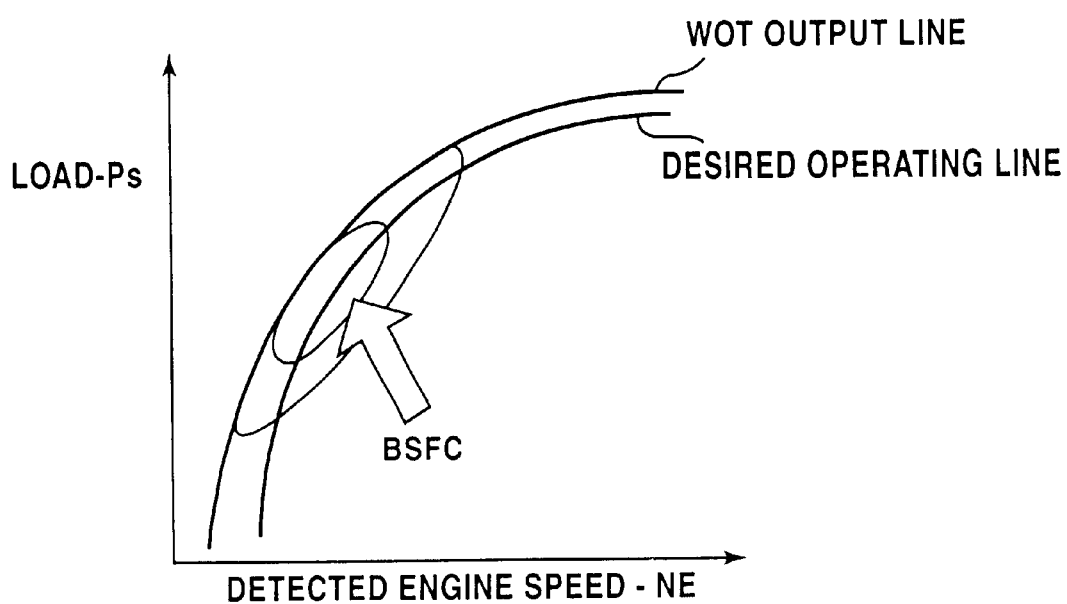
FIG. 4 is an explanatory graph showing the characteristics of an internal combustion engine illustrated in FIG. 1 for explaining a desired engine speed referred to in the flow chart of FIG. 2.

FIG. 4 is an explanatory diagram showing how engine speed NE of the engine 10 varies as a function of the load Ps (corresponding to the manifold absolute pressure PBA in the intake pipe). As shown, in order to achieve high-efficiency operation, this embodiment sets the desired operating line of the engine 10 in the region near the WOT output line where the fuel efficiency is good. Specifically, the desired engine speed NECMD is set to the value found through advance testing to optimize the BSFC, i.e., to minimize fuel consumption, at the desired power generation base value PGCMDBS.

Returning to the explanation of the flow chart of FIG. 2, next in S14 or S16, the desired engine speed NECMD of the engine 10 is determined in accordance with the so-determined desired power generation base value PGCMDBS. (As the engine output differs depending on whether or not EGR is in operation, the desired engine speed NECMD is modified accordingly.)

Next, in S18, the output of the crank angle sensor 52 is used to calculate or determine the deviation or error SNE between the detected engine speed NE and the determined desired engine speed NECMD. Then, in S20, the desired power generation base value PGCMDBS and the calculated deviation SNE are used as address data for retrieving a map PGLMTMP (whose characteristics not shown) and a gain KNE (a gain in the (proportional control rule) is calculated from the retrieved value KNEMAP.

A general explanation of the operation of the output control system for the series hybrid vehicle according to this embodiment will now be given with respect to FIG. 5 etc.

Figure 5:
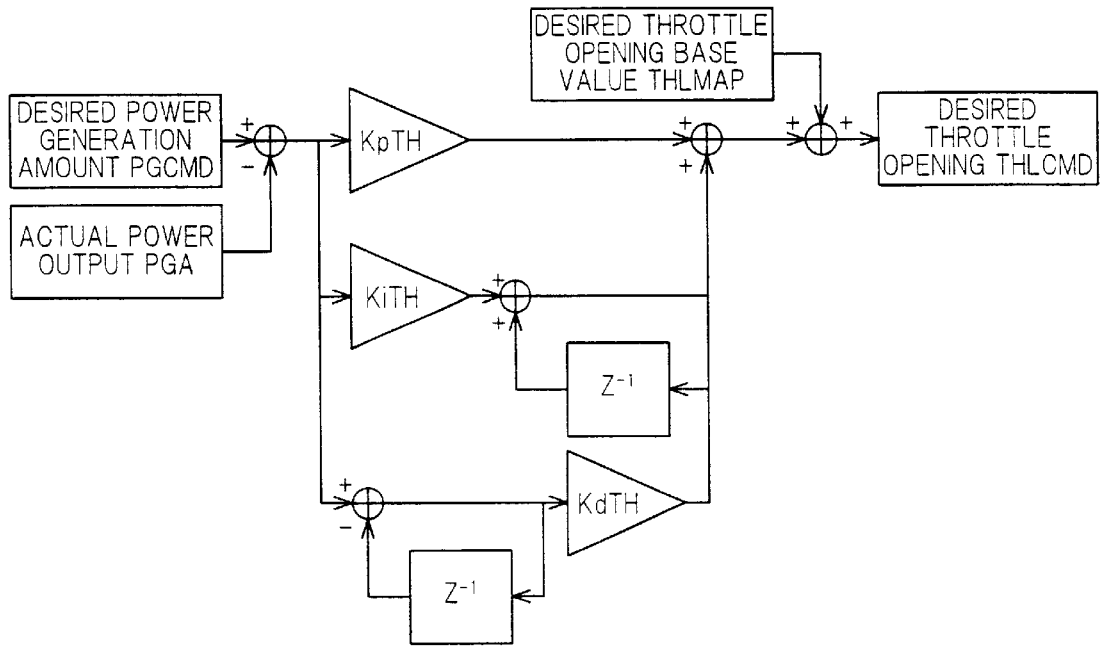
FIG. 5 is a block diagram showing a throttle opening control based on the desired power generation amount during the operation of the control system illustrated in FIG. 1.

In this control, the desired power generation base value of the first generator-motor 22 is calculated (determined), the calculated value is corrected to calculate or determine a desired power generation amount PGCMD in real time, and, as shown in FIG. 5, the output of the engine 10 is feedback-controlled through the throttle opening TH to bring the generated power output of the first generator-motor 22 to the desired power generation amount PGCMD.

On the other hand, the desired engine speed NECMD at the point of optimum BSFC, i.e., the point of minimum fuel consumption, is calculated or determined for the calculated desired power generation base value and the desired power generation base value PGCMDBS is corrected to calculate (determine) the desired power generation amount PGCMD so as to converge the engine speed NE on the desired engine speed NECMD.

Figure 6:
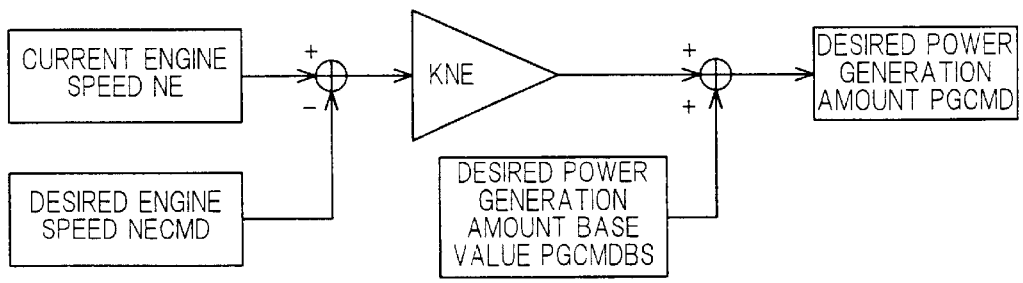
FIG. 6 is a block diagram showing the control of the desired power generation amount during the operation of the control system illustrated in FIG. 1.

Specifically, as shown in FIG. 6, the deviation between the detected (current) engine speed NE and the desired engine speed NECMD is calculated or determined, the result is multiplied by the gain KNE, the desired power generation base value PGCMDBS is added to the product, and the sum is defined as the desired power generation amount of the first generator-motor 22.

Figure 7:
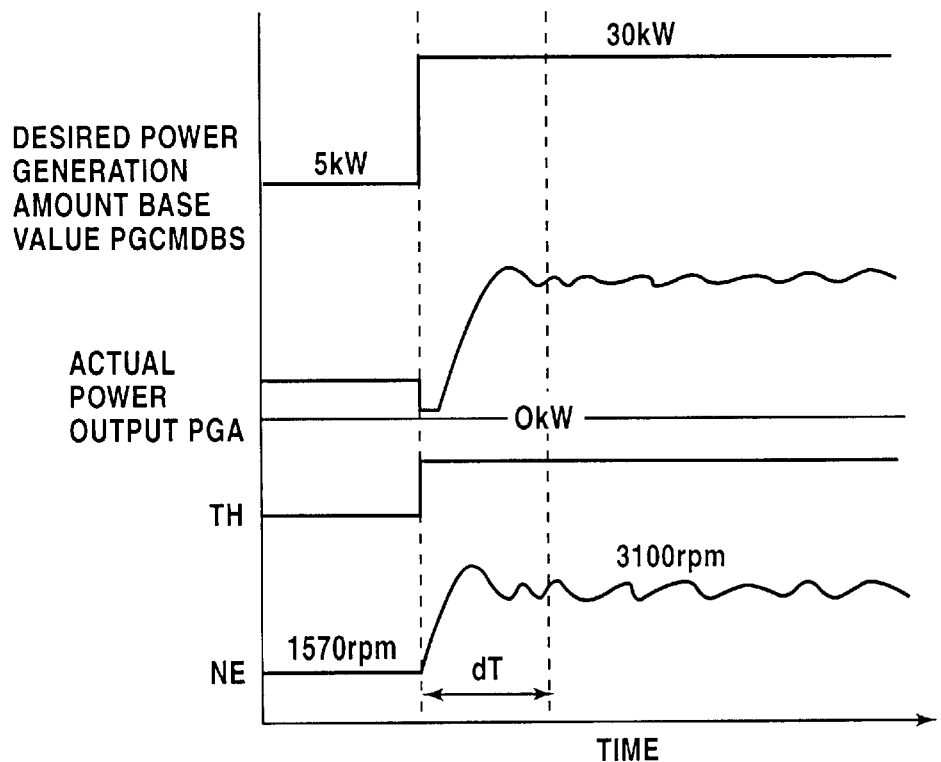
FIG. 7 is a time chart showing the control illustrated in FIG. 5 and FIG. 6.

The foregoing will be explained more specifically with reference to FIG. 7. Assume that the desired power generation base value PGCMDBS is changed from 5 kW to 30 kW and that, in line with this, the desired engine speed NE is changed from 1,570 rpm to 3,100 rpm.

The engine output is basically controlled by the throttle opening TH. The throttle opening TH therefore increases rapidly in response to the increase in the desired power generation base value. At this time, the desired power generation amount decreases temporarily at the change time point owing to a temporary decrease in the output of the first generator-motor 22. However, it thereafter reverses in the increase direction and, after the passage of time dT from the change time point, converges to the desired value. Owing to the temporary decrease in the output of the first generator-motor 22, it permits the engine 10 to rotate freely. The engine speed NE therefore quickly converges to the desired engine speed NECMD. The convergence time dT is determined by the gain KNE. When the gain is large, convergence is fast but the control amount fluctuates. When it is small, the stability of the control is good but more time is needed for convergence.

As shown in FIG. 5, a throttle opening correction value is calculated or determined using a PID (Proportional-Integral-Differential) control rule, while, as shown in FIG. 6, a desired power generation amount (output) correction value is calculated or determined using only the P control rule. This arrangement was adopted because the steady-state deviation of the first generator-motor 22 can be absorbed by the throttle opening control shown in FIG. 5 and also because of the desirability of preventing interference between the two control systems to the utmost possible.

Returning again to the explanation of the flow chart of FIG. 2, next, in S22, the desired power generation amount PGCMD is calculated or determined in the manner explained with reference to FIG. 6, i.e., by adding an output correction value (engine speed feedback amount) to the desired power generation base value PGCMDBS.

Figure 8:
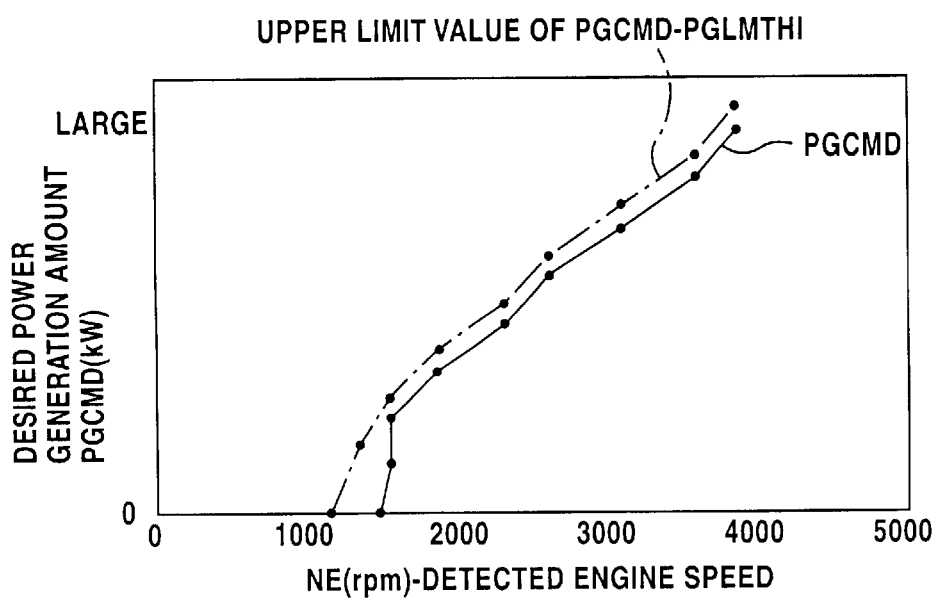
FIG. 8 is an explanatory graph showing the characteristics of a map defining an upper limit value PGLMTHI for preventing engine stalling referred to in the flow chart of FIG. 2.

Then, in S24, a value PGLMTMAP is retrieved from a map PGLMTMP (whose characteristics are shown in FIG. 8) using the detected engine speed NE as address datum and the upper limit value PGLMTHI of the desired power generation amount PGCMD is calculated or determined by adding a small value DPGLMTH to the retrieved value PGLMTMAP. The upper limit value PGLMTHI is a limit value for preventing stalling of the engine 10.

Specifically, when the first generator-motor 22 is driven by the engine 10, the engine 10 is liable to stall if the first generator-motor output becomes extremely large relative to the engine output. An upper limit value is therefore set in accordance with the engine speed NE. Stalling is particularly likely to occur in the low engine speed, low output region (NE=1,000 rmp or less) because balancing of the engine output and the generator-motor output is difficult in this region. The upper limit value PGLMTFI is therefore set to keep the engine speed from falling below a prescribed value (NE=1,200 rpm).

Then, in S26 of the flow chart of FIG. 2, it is checked whether the desired power generation amount PGCMD is greater than the upper limit value PGLMTHI. When the result is YES, the program goes to S28, in which the desired power generation amount PGCMD is replaced by GLMTHI. When the result is NO, the program goes to S30, in which the desired power generation amount is set as such without modification.

Next, in S32, it is checked whether the desired power generation base value PGCMDBS is less than zero (negative) or whether the bit of a flag F.ENGRUN is set to 1. The bit of the flag F.ENGRUN is set to 1 in a separate routine (not shown) when the engine is running. The check in S32 therefore amounts to determining whether the engine is stopped or whether the first generator-motor 22 is not required to generate power.

When the result in S32 is YES, the program goes to S34 in which the desired power generation amount PGCMD is set to zero. When it is NO, the program goes to S36 in which it is checked whether the desired power generation amount PGCMD is greater than the maximum output PGCMDHI of the first generator-motor 22. When the result is YES, the program goes to S38, in which the desired power generation amount is restricted to the maximum value PGCMDH.

When the result in S36 is NO, the program goes to S40, in which it is checked whether the desired power generation amount PGCMD is less than the minimum output PGCMDLO of the first generator-motor 22. When the result is YES, the program goes to S42, in which the desired power generation amount is restricted to the minimum value PGCMDLO.

When the result in S40 is NO, the program goes to S44, in which it is checked whether the detected coolant temperature TW is less than a prescribed value TWVTECH/L and the desired power generation amount PGCMD is greater than a prescribed value PMVTLMR.

As mentioned earlier, the engine 10 is equipped with the variable valve timing system V/T. When the detected coolant temperature TW is less than the prescribed value TWVTECH/L, the variable valve timing system V/T is prohibited from effecting control for switching the valve timing characteristics to the high-speed side. The prescribed value PMVTLMT is the minimum value at which the desired power generation amount can be achieved solely by high-speed side valve timing characteristics. The check in S44 therefore amounts to determining whether, when switchover to high-speed side valve timing characteristics is prohibited, the desired power generation amount is greater than the value beyond which the desired power generation amount cannot be achieved without switching to such characteristics.

When the result in S44 is YES, the program goes to S46, in which the desired power generation amount is set to the minimum value. When it is NO, the program goes to S48 in which the desired power generation amount is set as such without modification.

The calculation or determination of the desired throttle opening THCMD in accordance with the desired power generation amount determined in the forgoing manner, already generally explained with reference FIG. 5, will now be explained in detail.

Figure 9:
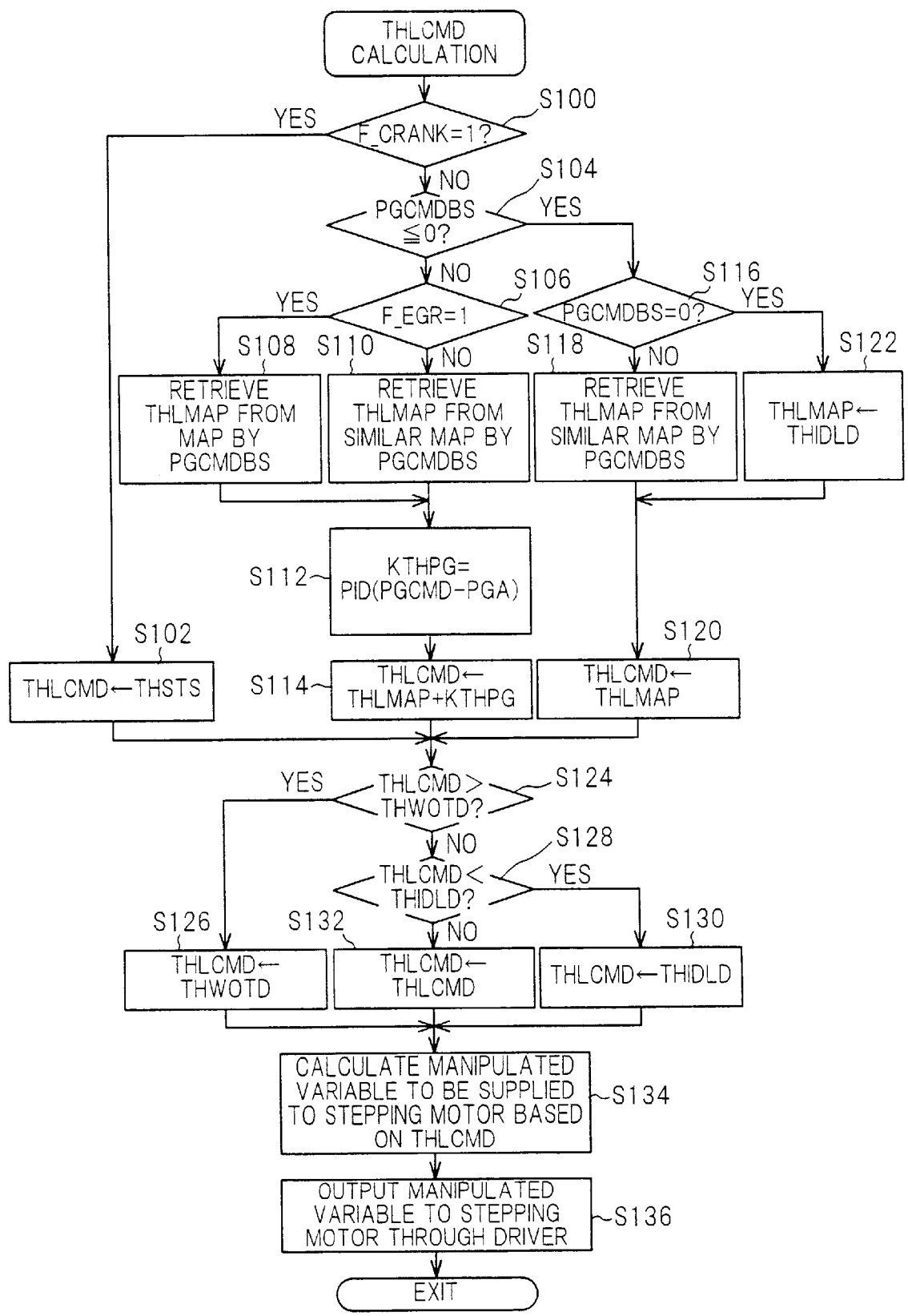
FIG. 9 is a flow chart showing the operation of the system, more particularly the calculation or determination of a desired throttle opening THCMD (illustrated in the block diagram of FIG. 5) during the operation of the control system illustrated in FIG. 1.

FIG. 9 is a flow chart of the processing operations for this calculation or determination. The program according to this flow chart is also executed at prescribed intervals of, for example, 10 msec.

First, in S100, it is checked whether the bit of a flag F.CRANK is set to 1. The bit of this flag set to 1 during control effected by a separate routine (not shown) when the engine 10 is starting (start mode).

When the result in S100 is YES, the program goes to S102, in which the desired throttle opening THLCMD is set to a prescribed start mode value THSTS. When it is NO, the program goes to S104, in which it is checked whether the desired power generation base value PGCMDBS is less than zero, i.e., whether a generation command has been issued.

Figure 10:
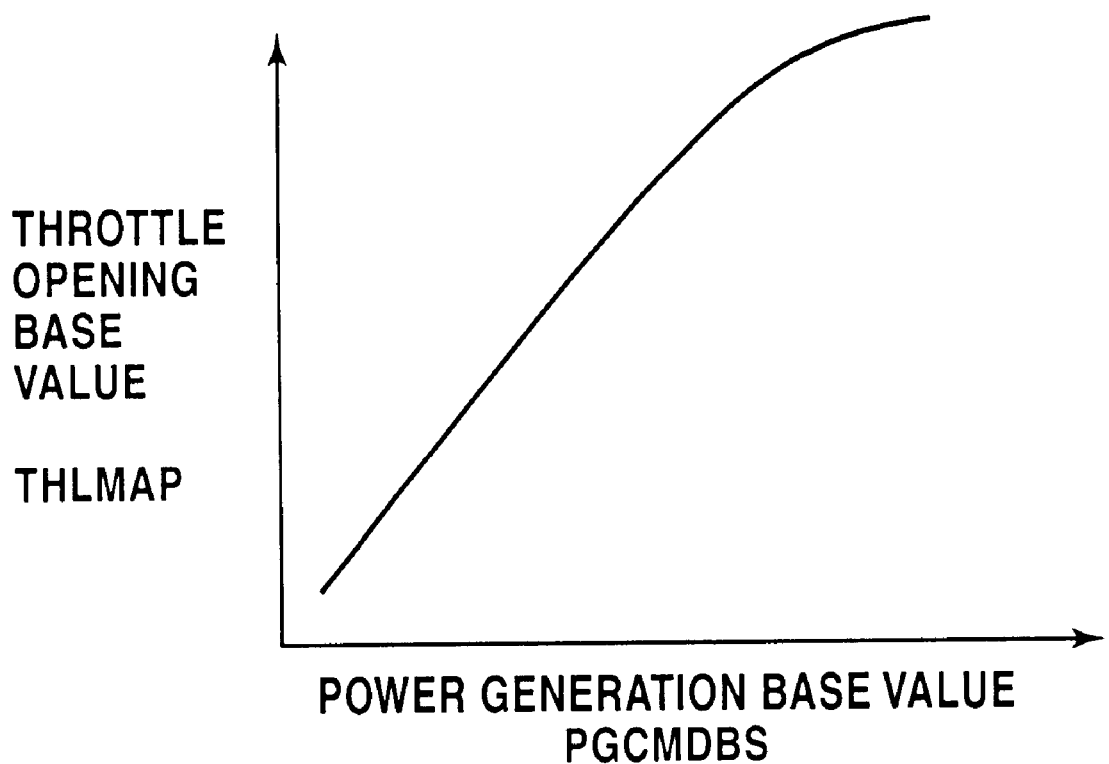
FIG. 10 is an explanatory graph showing the characteristics of a map defining a desired throttle opening base value THLMAP referred to in the flow chart of FIG. 9.

When the result in S104 is NO, the program goes to S106, in which it is checked whether the bit of the flag F.EGR is set to 1. When it is YES, the program goes to S108, in which a desired throttle opening base value THLMAP is retrieved from a map THCMDMPE (whose characteristics are shown in FIG. 10) using the desired power generation base value PGCMDBS as address datum. When the result is NO, the program goes to S110, in which the desired throttle opening base value THLMAP is retrieved from a similar map THCMDMP (whose characteristics are not shown).

The reason for using a different desired throttle opening base value THLMAP depending on whether or not EGR is in effect is because, as explained earlier, the engine output differs depending on whether or not EGR is in effect.

Next, in S112, an opening correction value (generation feedback amount) is calculated or determined. As shown in FIG. 5, the actual power output currently generated by the first generator-motor 22 is estimated and the deviation between the desired power generation amount PGCMD determined by the processing of the flow chart of FIG. 2 and the estimated power output PGA is calculated or determined and the result is multiplied by PID (Proportional-Integral-Differential) control gains (illustrated generally as "PID" in the figure, i.e., kpTH (P gain), kiTH (I gain) and kdTH (D gain)) to obtain an output correction amount KTHPG.

Specifically, the remaining battery energy is calculated from the outputs of the current sensor 58 and the voltage sensor 60, the power consumption of the second generator-motor 36 is subtracted from the result to obtain the power generation voltage of the first generator-motor 22, the result is corrected by the resistance value of the circuit resistance and the like, the actual power output PGA which the first generator-motor 22 generates is estimated, then deviation between the desired power generation amount and the estimated actual power output is calculated or determined, and the result is then multiplied by the PID gains to calculate or determine the output correction amount KTHPG.

Next, in S114, the calculated opening correction value is added to the desired throttle opening base value THLMAP to obtain the desired throttle opening THLCMD.

When the result in S104 is NO, the program goes to S116, in which it is checked whether the desired power generation base value PGCMDBS is zero, i.e., not negative, and thus whether no consumption command has been issued by the battery 26 and the second generator-motor 36.

When the result in S116 is NO, the program goes to S118, in which the desired throttle opening base value THLMAP is retrieved from a map THCMDMPR (whose characteristics are not shown, but similar to those used in S108) using the desired power generation base value PGCMDBS, and then goes to S120, in which the desired throttle opening TBLCMD is set to the detected value (unmodified).

When the result in S116 is YES, the program goes to S122, in which the desired throttle opening base value is set to a prescribed value THIDLD corresponding to an idle opening near fully closed, and then goes to S120.

The program then advances to S124 and the ensuing steps to subject the desired throttle opening THLCMD to a limit check. Specifically, in S124, it is checked whether the calculated desired throttle opening THLCMD is greater than a throttle opening upper limit THWOTD. When the result is YES, the program goes to S126, in which the desired throttle opening THLCMD is restricted to the upper limit.

When the result in S124 is NO, the program goes to S128, in which it is checked whether the desired throttle opening THLCMD is less than the prescribed value THIDLD, which corresponds to the idle opening. When the result is YES, the program goes to S130, in which the desired throttle opening THLCMD is restricted to the prescribed value. When the result is NO, the program goes to S132, in which the desired throttle opening THLCMD is maintained without modification.

Next, in S134, the control input to be supplied to the stepping motor 46 for achieving the desired throttle opening is determined, whereafter, in S136, the manipulated variable is sent to the stepping motor 46 through a stepping motor drive circuit (not shown) to drive the throttle valve 14 to the desired throttle opening THLCMD.

As explained in the foregoing, this embodiment calculates or determines the desired output (desired power generation amount) of the first generator-motor based on the required input (required power consumption amount) of the second generator-motor in real time and supplies the desired output in real time while controlling the engine speed to the point that optimizes the BSFC, i.e., minimizes internal combustion engine fuel consumption, of the engine 10. The embodiment therefore achieves a marked improvement in fuel efficiency.

Moreover, once the desired engine speed NECMD is determined at the point of minimum fuel consumption, the first generator-motor 22 allows the engine 10 to rotate freely. The actual engine speed NE can therefore be converged on the desired engine speed NECMD.

In addition, a battery of relatively small capacity suffices, and even when the required input increases momentarily in response to the operating state, the required input can be supplied in real time. The battery 26 is also safe from damage by overcharging.

Further, since the desired power generation amount is subjected to a limit check, stalling of the engine 10 does not occur even if the engine speed is increased or decreased through the first generator-motor 22.

In accordance with the first aspect of the invention, there is provided a system for controlling an output of a series hybrid vehicle, having an internal combustion engine (10) whose output is regulated by a throttle valve (14), a generator-motor (22) connected to the engine to be rotated by the engine, an electric energy storage means (26) connected to the first generator-motor to be charged by the first generator-motor, and a second generator-motor (36) connected to at least one of the first generator-motor and the electric energy storage means to input an output of at least one of the first generator-motor and the electric energy storage means to drive wheels (28) of the vehicle to propel the vehicle, characterized in that the system comprises: desired first generator-motor power generation base value determining means (ECU 70, S10) for determining a desired power generation base value (PGCMDBS) of the first generator-motor (22) which the first generator-motor is desired to generate; desired engine speed determining means (ECU 70, S12–S16) for determining a desired engine speed (NECMD) which the engine (10) is desired to generate; desired first generator-motor power generation amount determining means (ECU 70, S18–48) for determining a desired power generation amount (PGCMD) of the first generator-motor which the first generator-motor is desired to generate, based on the determined desired power generation base value (PGCMDBS) and the desired engine speed (NECMD); desired throttle opening determining means (ECU 70, S100–S136) for determining a desired throttle opening (THLCMD) of the throttle valve (14) based on the desired power generation amount (PGCMD) of the first generator-motor (22); and throttle valve driving means (ECU 70, pulse motor 46) for driving the throttle valve (14) based on the determined throttle opening (TH).

With this, it is possible to determine the desired power generation amount of the first generator-motor based on the requirement of the second generator-motor (electric motor) in real time and to supply the desired amount in real time while effecting operation at the point that optimizes the BSFC of the internal combustion engine, i.e., that minimizes its fuel consumption.

In accordance with the second aspect of the invention, the desired first generator-motor power generation amount determining means includes: engine operating condition detecting means (ECU 70, S18) for detecting operating condition of the engine (10) including at least the engine speed (NE) generated by the engine; correction value calculating means (ECU 70, S18–20) for calculating a deviation (SNE) between the detected engine speed (NE) and the determined desired engine speed (NECMD) and for calculating a correction value (SNE×KNE) by multiplying a gain (KNE) by the calculated deviation (SNE); and desired first generator-motor power generation amount calculating means (ECU 70, S22) for calculating the desired power generation amount (PGCMD) of the first generator-motor (22) by adding the correction value to the determined power generation base value (PGCMDBS).

With this, it is possible to determine the desired power generation amount of the first generator-motor based on the requirement of the second generator-motor (electric motor) in real time, supply the desired amount in real time while effecting operation at the point that optimizes the BSFC of the internal combustion engine, i.e., that minimizes its fuel consumption, and improve response by rapidly converging the internal combustion engine speed on the desired value.

In accordance with the third aspect of invention, the desired throttle opening determining means includes: desired throttle opening base value determining means (ECU 70, S100–S118, S122) for determining a desired throttle opening base value (THLMAP) of the throttle valve (14); first generator-motor output estimating means (ECU 70, S112) for estimating an actual power output (PGA) of the first generator-motor (22) which the first generator-motor generates; correction value calculating means (ECU 70, S112) for calculating a deviation (PGCMD−PGA) between the estimated power output (PGA) and the determined desired power generation amount (PGCMD) of the first generator-motor (22) and for calculating a correction value (KTHPG) by multiplying a gain (PID) by the calculated deviation; and desired throttle opening calculating means (ECU 70, 8S114, S120) for calculating the desired throttle opening (THCMD) by adding the correction value to the desired throttle opening base value.

With this, it is possible to determine the desired generation amount of the first generator-motor based on the requirement of the second generator-motor (electric motor) in real time and to supply the desired amount in real time while effecting operation at the point that optimizes the BSFC of the internal combustion engine, i.e., that minimizes its fuel consumption.

In accordance with the fourth aspect of the invention, the desired first generator-motor power generation amount determining means includes: power comparing means (ECU 70, S26) for comparing the desired power generation amount (PGCMD) with a limit value (PGLMTHI); and replacing means (ECU 70, S28) for replacing the desired power generation amount by the limit value when the desired power generation amount is found to be greater than the limit value.

With this, it is possible to determine the desired output of the first generator-motor based on the requirement of the second generator-motor (electric motor) in real time, supply the desired output in real time while effecting operation at the point that optimizes the BSFC of the internal combustion engine, i.e., that minimizes its fuel consumption, without stalling the internal combustion engine.

Further, the system is configured such that the desired engine speed determining means determining the desired engine speed (NECMD) to minimize fuel consumption, and the first generator-motor (22) has an approximately same output capability as the engine (10) such that a capacity of the electric energy storage means (26) is made small.

Furthermore, the system is configured such that the engine (10) is equipped with an EGR system (42) and wherein the desired engine speed determining means includes: determining means (ECU 70, S12) for determining whether EGR control is being conducted; and determines the desired engine speed (NECMD) differently depending upon the determination.

Furthermore, the system is configured such that the engine (10) is equipped with an EGR system (42) and wherein the desired throttle opening base value determining means includes: determining means (ECU 70, S106) for determining whether EGR control is being conducted; and determines the desired throttle opening base value (THLMAP) differently depending upon the determination.

Furthermore, the system is configured such that the engine (10) is equipped with a variable valve timing system (V/D and wherein the desired first generator-motor power generation amount determining means includes: determining means (ECU 70, S44) for determining whether, when switchover to high-speed side valve timing characteristics is prohibited, the desired power generation amount (PGCMD) is achieved without switching to the characteristics; and determines the desired first generator-motor power generation amount (PGCMD) separately depending upon the determination.

In the system,the gain (KNE) is a P gain, and the gain (PID) comprises a P gain, an I gain and a D gain.

Although the invention has been explained with reference to a series hybrid vehicle, it can also be applied to a parallel hybrid vehicle.

Although a battery is used as the electrical energy storage means in the foregoing, a capacitor or any other means capable of storing electrical energy can be used instead.

Although the engine output is controlled by the throttle opening TH in the foregoing, it can instead be controlled by controlling the amount of intake air using an intake air amount regulating means other than a throttle.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling an output of a series hybrid vehicle, having an internal combustion engine whose output is regulated by a throttle valve, a generator-motor connected to the engine to be rotated by the engine, an electric energy storage means connected to the first generator-motor to be charged by the first generator-motor, and a second generator-motor connected to at least one of the first generator-motor and the electric energy storage means to input an output of at least one of the first generator-motor and the electric energy storage means to drive wheels of the vehicle to propel the vehicle, comprising;

desired first generator-motor power generation base value determining means for determining a desired power generation base value of the first generator-motor which the first generator-motor is desired to generate;

desired engine speed determining means for determining a desired engine speed which the engine is desired to generate;

desired first generator-motor power generation amount determining means for determining a desired power generation amount of the first generator-motor which the first generator-motor is desired to generate, based on the determined desired power generation base value and the desired engine speed;

desired throttle opening determining means for determining a desired throttle opening of the throttle valve based on the desired power generation amount of the first generator motor;

throttle valve driving means for driving the throttle valve based on the determined throttle opening; and wherein the desired first generator-motor power generation amount determining means includes:

engine operating condition detecting means for detecting operating condition of the engine including at least the engine speed generated by the engine;

correction value calculating means for calculating a deviation between the detected engine speed and the determined desired engine speed (NECMD) and for calculating a correction value by multiplying a gain by the calculated deviation; and desired first generator-motor power generation amount calculating means for calculating the desired power generation amount of the first generator-motor by adding the correction value to the determined power generation base value.

2. A system according to claim 1, wherein the desired engine speed determining means determining the desired engine speed to minimize fuel consumption.

3. A system according to claim 1, wherein the first generator-motor has an approximately same output capability as the engine such that a capacity of the electric energy storage means is made small.

4. A system according to claim 1, wherein the engine is equipped with an EGR system and wherein the desired engine speed determining means includes:

determining means for determining whether EGR control is being conducted; and determines the desired engine speed differently depending upon the determination.

5. A system according to claim 1, wherein the engine is equipped with an EGR system and wherein the desired throttle opening base value determining means includes:

determining means for determining whether EGR control is being conducted; and determines the desired throttle opening base value differently depending upon the determination.

6. A system according to claim 1, wherein the engine is equipped with a variable valve timing system and wherein the desired first generator-motor power generation amount determining means includes:

determining means for determining whether, when switchover to high-speed side valve timing characteristics is prohibited, the desired power generation amount is achieved without switching to the characteristics; and determines the desired first generator-motor power generation amount separately depending upon the determination.

7. A system according to claim 1, wherein the gain is a Proportional gain.

8. A system for controlling an output of a series hybrid vehicle, having an internal combustion engine whose output is regulated by a throttle valve, a generator-motor connected to the engine to be rotated by the engine, an electric energy storage means connected to the first generator-motor to be charged by the first generator-motor, a second generator-motor connected to at least one of the first generator-motor and the electric energy storage means to input an output of at least one of the first generator-motor and the electric energy storage means to drive wheels of the vehicle to propel the vehicle, comprising:

desired first generator-motor power generation base value determining means for determining a desired power generation base value of the first generator-motor which the first generator-motor is desired to generate;

desired engine speed determining means for determining a desired engine speed which the engine is desired to generate;

desired first generator-motor power generation amount determining means for determining a desired power generation amount of the first generator-motor which the first generator-motor is desired to generate, based on the determined desired power generation base value and the desired engine speed;

desired throttle opening determining means for determining a desired throttle opening of the throttle valve based on the desired power generation amount of the first generator motor;

throttle valve driving means for driving the throttle valve based on the determined throttle opening; and wherein the desired throttle opening determining means includes:

desired throttle opening base value determining means for determining a desired throttle opening base value of the throttle valve;

first generator-motor output estimating means for estimating an actual power output of the first generator-motor which the first generator-motor generates;

correction value calculating means for calculating a deviation between the estimated power output and the determined desired power generation amount of the first generator-motor and for calculating a correction value by multiplying a gain by the calculated deviation; and desired throttle opening calculating means for calculating the desired throttle opening by adding the correction value to the desired throttle opening base value.

9. A system according to claim 8, wherein the gain comprises a Proportional gain, an Integral gain and a Differential gain.

10. A system for controlling an output of a series hybrid vehicle, having an internal combustion engine whose output is regulated by a throttle valve, a generator-motor connected to the engine to be rotated by the engine, an electric energy storage means connected to the first generator-motor to be charged by the first generator-motor, random a second generator-motor connected to at least one of the first generator-motor and the electric energy storage means to input an output of a least one of the first generator-motor and the electric energy storage means to drive wheels of the vehicle to propel the vehicle, comprising:

desired first generator-motor power generation base valve determining means for determining a desired power generation base value of the first generator-motor which the first generator-motor is desired to generate;

desired engine speed determining means for determining a desired engine speed which the engine is desired to generate;

desired first generator-motor power generation amount determining means for determining a desired power generation amount of the first generator-motor which the first generator-motor is desired to generate, based on the determined desired power generation base value and the desired engine speed; desired throttle opening determining means for determining a desired throttle opening of the throttle valve based on the desired power generation amount of the first generator motor;

throttle valve driving means for driving the throttle valve based on the determined throttle opening; and wherein the desired first generator-motor power generation amount determining means includes:

power comparing means for comparing the desired power generation amount with a limit value; and replacing means for replacing the desired power generation amount by the limit value when the desired power generation amount is found to be greater than the limit value.

11. A method of controlling an output of a series hybrid vehicle having an internal combustion engine whose output is regulated by a throttle valve, a generator-motor connected to the engine to be rotated by the engine, an electric energy storage means connected to the first generator-motor to be charged by the first generator-motor, and a second generator-motor connected to at least one of the first generator-motor and the electric energy storage means to input an output of at least one of the first generator-motor and the electric energy storage means to drive wheels of the vehicle to propel the vehicle, comprising the steps of:

determining a desired power generation base value of the first generator-motor which the first generator-motor is desired to generate;

determining a desired engine speed which the engine is desired to generate;

determining a desired power generation amount of the first generator-motor which the first generator-motor is desired to generate, based on the determined desired power generation base value and the desired engine speed;

determining a desired throttle opening of the throttle valve based on the desired power generation amount of the first generator-motor;

driving the throttle valve based on the determined throttle opening; and wherein the step of the desired first generator-motor power generation amount determination includes the steps of:

detecting operating condition of the engine including at least the engine speed generated by the engine;

calculating a deviation between the detected engine speed and the determined desired engine speed (NECMD) and for calculating a correction value by multiplying a gain by the calculated deviation; and calculating the desired power generation amount of the first generator-motor by adding the correction value to the determined power generation base value.

12. A method according to claim 11, wherein the step of the desired engine speed determination determining the desired engine speed to minimize fuel consumption.

13. A method according to claim 11, wherein the first generator-motor has an approximately same output capability as the engine such that a capacity of the electric energy storage means is made small.

14. A method according to claim 11, wherein the engine is equipped with an EGR system and wherein the step of the desired engine speed determination includes:

determining means for determining whether EGR control is being conducted; and determining the desired engine speed differently depending upon the determination.

15. A method according to claim 11, wherein the engine is equipped with an EGR system and wherein the step of the desired throttle opening base value determination includes the steps of:

determining whether EGR control is being conducted; and determining the desired throttle opening base value differently depending upon the determination.

16. A method according to claim 11, wherein the engine is equipped with a variable valve timing system and wherein the step of desired first generator-motor power generation amount determination includes the steps of:

determining whether, when switchover to high-speed side valve timing characteristics is prohibited, the desired power generation amount is achieved without switching to the characteristics; and determining the desired first generator-motor power generation amount separately depending upon the determination.

17. A method according to claim 11, wherein the gain is a Proportional gain.

18. A method of controlling an output of a series hybrid vehicle having an internal combustion engine whose output is regulated by a throttle valve, a generator-motor connected to the engine to be rotated by the engine, an electric energy storage means connected to the first generator-motor to be charged by the first generator-motor, and a second generator-motor connected to at least one of the first generator-motor and the electric energy storage means to input an output of at least one of the first generator-motor and the electric energy storage means to drive wheels of the vehicle to propel the vehicle, comprising the steps of;

determining a desired power generation base value of the first generator-motor which the first generator-motor is desired to generate;

determining a desired engine speed which the engine is desired to generate;

determining a desired power generation amount of the first generator-motor which the first generator-motor is desired to generate, based on the determined desired power generation base value and the desired engine speed;

determining a desired throttle opening of the throttle valve based on the desired power generation amount of the first generator-motor;

driving the throttle valve based on the determined throttle opening; and wherein the step of the desired throttle opening determination includes the steps of:

determining a desired throttle opening base value of the throttle valve;

estimating an actual power output of the first generator-motor which the first generator-motor generates;

calculating a deviation between the estimated power output and the determined desired power generation amount of the first generator-motor and for calculating a correction value by multiplying a gain by the calculated deviation; and calculating the desired throttle opening by adding the correction value to the desired throttle opening base value.

19. A method according to claim 18, wherein the gain comprises a Proportional gain, an Integral gain and a Differential gain.

20. A method of controlling an output of a series hybrid vehicle having an internal combustion engine whose output is regulated by a throttle valve, a generator-motor connected to the engine to be rotated by the engine, an electric energy storage means connected to the first generator-motor to be charged by the first generator-motor, and a second generator-motor connected to at least one of the first generator-motor and the electric energy storage means to input an output of at least one of the first generator-motor and the electric energy storage means to drive wheels of the vehicle to propel the vehicle, comprising the steps of:

determining a desired power generation base value of the first generator-motor which the first generator-motor is desired to generate;

determining a desired engine speed which the engine is desired to generate;

determining a desired power generation amount of the first generator-motor which the first generator-motor is desired to generate, based on the determined desired power generation base value and the desired engine speed;

determining a desired throttle opening of the throttle valve based on the desired power generation amount of the first generator-motor;

driving the throttle valve based on the determined throttle opening; and wherein the step of desired first generator-motor power generation amount determination includes the steps of:

comparing the desired power generation amount with a limit value; and replacing the desired power generation amount by the limit value when the desired power generation amount is found to be greater than the limit value.

* * * * *